United States Patent
Netsch et al.

(10) Patent No.: US 11,914,753 B2
(45) Date of Patent: Feb. 27, 2024

(54) CONTAINER BUILDER FOR INDIVIDUALIZED NETWORK SERVICES

(71) Applicant: KONINKLIJKE PHILIPS N.V., Eindhoven (NL)

(72) Inventors: Thomas Netsch, Hamburg (DE); Thomas Erik Amthor, Hamburg (DE); Jörn Borgert, Hamburg (DE); Michael Günter Helle, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 449 days.

(21) Appl. No.: 17/260,587

(22) PCT Filed: Oct. 22, 2019

(86) PCT No.: PCT/EP2019/078694
§ 371 (c)(1),
(2) Date: Jan. 15, 2021

(87) PCT Pub. No.: WO2020/083891
PCT Pub. Date: Apr. 30, 2020

(65) Prior Publication Data
US 2021/0271777 A1    Sep. 2, 2021

(30) Foreign Application Priority Data

Oct. 22, 2018    (EP) .................................... 18201688

(51) Int. Cl.
*G06F 21/62* (2013.01)
*G06F 9/455* (2018.01)
(Continued)

(52) U.S. Cl.
CPC ...... *G06F 21/6281* (2013.01); *G06F 9/45558* (2013.01); *G06F 21/53* (2013.01);
(Continued)

(58) Field of Classification Search
CPC .. G06F 21/6281; G06F 9/45558; G06F 21/53; G06F 2009/45587; G06F 2009/45595; G06F 9/455; H04L 67/02
See application file for complete search history.

(56) References Cited

U.S. PATENT DOCUMENTS

| 6,618,764 B1 | 9/2003 | Shteyn |
| 2011/0314466 A1 | 12/2011 | Berg et al. |

(Continued)

FOREIGN PATENT DOCUMENTS

| EP | 326735 A1 | 8/1989 |
| JP | 2017010195 A | 1/2017 |

(Continued)

OTHER PUBLICATIONS https://www.docker.com.
(Continued)

*Primary Examiner* — Izunna Okeke

(57) ABSTRACT

Some embodiments are directed to a container builder (110) for building a container image for providing an individualized network service based on sensitive data (122) in a database (121). The container builder (110) retrieves the sensitive data (122) from the database (121), builds the container image (140), and provides it for deployment to a cloud service provider (111). The container image (140) comprises the sensitive data (122) and instructions that, when deployed as a container, cause the container to provide the individualized network service based on the sensitive data (122) comprised in the container image (140).

14 Claims, 7 Drawing Sheets

(51) Int. Cl.
G06F 21/52 (2013.01)
G06F 21/53 (2013.01)
H04L 67/02 (2022.01)

(52) U.S. Cl.
CPC .... H04L 67/02 (2013.01); *G06F 2009/45587* (2013.01); *G06F 2009/45595* (2013.01)

(56) References Cited

U.S. PATENT DOCUMENTS

| | | | |
|---|---|---|---|
| 2015/0154415 A1* | 6/2015 | Wu | G06F 11/3684 713/165 |
| 2017/0098092 A1 | 4/2017 | Agbabian et al. | |
| 2017/0154017 A1* | 6/2017 | Kristiansson | G06F 40/143 |
| 2017/0177860 A1 | 6/2017 | Suarez | |
| 2017/0353496 A1 | 12/2017 | Pai | |

FOREIGN PATENT DOCUMENTS

| | | |
|---|---|---|
| JP | 2017111761 A | 6/2017 |
| JP | 2018028764 A | 2/2018 |

OTHER PUBLICATIONS

Merkel, D., "Docker: Lightweight Linux Containers for Consistent Development and Deployment", Linux Journal, vol. 2014, Issue 239, Mar. 2014.

International Search Report for PCT/EP2019/078694 dated Oct. 22, 2019.

Merkel, D., "Docker: Lightweight Linux containers for consistent development and deployment," Linux Journal 2014, vol. 2014, nr. 239, pp. 5, 76-91.

McMurry, A.J. et al., "Improved de-identification of physician notes through integrative modeling of both public and private medical text". BMC Medical Informatics and Decision Making (2013) 13:112, pp. 1-11.

* cited by examiner

CONTAINER BUILDER FOR INDIVIDUALIZED NETWORK SERVICES

CROSS-REFERENCE TO PRIOR APPLICATIONS

This application is the U.S. National Phase application under 35 U.S.C. § 371 of International Application No. PCT/EP2019/078694, filed on Oct. 22, 2019, which claims the benefit of European Patent Application No. 18201688.1, filed on Oct. 22, 2018. These applications are hereby incorporated by reference herein.

FIELD OF THE INVENTION

The invention relates to a container builder, a cloud service provider, a container builder method, a cloud service provider method, and a computer-readable medium.

BACKGROUND OF THE INVENTION

US 2011/314466 A1 discloses creating an instance of a cloud computing environment.

EP 3267351 A1 discloses securely managing a Docker image.

In various settings, it is beneficial to offer network services such as web applications based on sensitive information over a public network such as the internet. For instance, various services may be offered based on medical information about a patient, such as allowing a patient to inspect electronic medical records, or fill in online assessments, e.g., questionnaires. Services may also be offered based on other kinds of sensitive information, e.g., commercially sensitive information about a company may be used for benchmarking, accounting, or similar.

Offering services over a public network may have various security risks. In particular, attackers may try to compromise the confidentiality and/or integrity of the sensitive information in various ways. For example, attackers may attempt to break into a database server storing the sensitive information, e.g., about the patients or companies to which the services are offered. Or, attackers may attempt to break into a server offering the network service, e.g., the web application. In doing this, attackers may use various known techniques, e.g., using exploits in various software used by the servers and/or or using side channels. For example, the recent Spectre and Meltdown vulnerabilities of modern processors may allow an attacker with non-privileged access to a server to illegitimately obtain data from processes running concurrently at the server. Attackers may be external attackers but could also be insiders and/or legitimate users of the network service, e.g., a user trying to obtain or edit information of another user.

Hence, there may be a need to address various security risks relating to providing network services based on sensitive data.

A known technique to address at least some of these risks is containerization. For example, in US 2017/0098092 A2, techniques are disclosed for generating a virtual private container. The virtual private container defines a self-contained software environment comprising one or more analytic components configured to carry out specified analytic functions on data within the container. The analytic components are isolated to run within the container so as to prevent data sharing between containers. The virtual private container may access user data from external systems such as a HDFS store, for which a user of the service may provide authorization information, e.g., an identity.

SUMMARY OF THE INVENTION

A disadvantage of existing systems for offering network service systems based on sensitive data, such as US 2017/0098092 A2, is that they insufficiently address the various security risks relating to providing network services based on sensitive data. For example, sensitive data may be stored in an external storage such as a database. In existing systems, various devices may need to have access to this external storage. For example, virtual private containers deployed at various hosts may each need access to the external storage. Hence, the external storage may need to be publicly or at least widely accessible, and thereby becomes a tempting target for attacks. Moreover, the existing system of US 2017/0098092 A2 does not allow writing updated data back to the storage. More generally, in existing systems, sensitive information about multiple users, or potential users, of the system may be stored in a central location that may not be sufficiently secured.

To better address one or more of these concerns, a container builder and/or a cloud service provider are proposed as defined in the independent claims. The container builder builds a container image for providing an individualized network service, e.g., a web application, based on sensitive data in a database. The inventors realized that exposure of the sensitive data may be limited if it is included in the container image. The database can be a private database of the container builder. The container builder retrieves the sensitive data from the database, builds the container image, and provides it for deployment to the cloud service provider. The container image comprises the sensitive data and instructions that, when deployed as a container, cause the container to provide the individualized network service based on the sensitive data. The cloud service provider receives such a container image for deployment and deploys it as a container.

This arrangement improves security, e.g., because the database may be less exposed; e.g., the cloud service provider and/or a container host at which the container is deployed does not need to access the database directly, so the database does not need to be available to them, e.g., it can be deployed at or near the container builder. Moreover, exposure of the container builder is limited, e.g., the container builder does need to accept incoming connections, may be behind a firewall, and/or may connect to the network only for providing the container image. Although the container host is more exposed, e.g., it may accept incoming network connections in order to offer the network service, it only stores a limited amount of data so the impact of a breach is smaller. Also, less network connectivity may be needed from the container host since it does not need to access an external source to obtain the sensitive data.

In an embodiment, the sensitive data comprises personal information about a user to whom the individualized network service is provided. In an embodiment, the personal information comprises an electronic medical record. In such embodiments, protection of sensitive information is particularly beneficial given the high sensitivity of the data.

In an embodiment, the container image terminates after a time limit and/or after use of the individualized network service is completed, further reducing exposure.

In an embodiment, the container builder obtains updated data, updated by the individualized network service, and stores it in the database. This way, the network service may not only use sensitive data from the database but also produce data for the database, without the database needing to be exposed externally. To improve protection, the container may encrypt the updated data. The container builder may also provide authentication information to an intended user of the individualized network service, such as a private address and/or a token, thereby reducing the risk of unauthorized access to the network service.

Further aspects of the invention concern a container builder method and a cloud service provider method. Embodiments of these methods may be implemented on a computer as a computer implemented method, or in dedicated hardware, or in a combination of both. Executable code for an embodiment of a method may be stored on a computer program product. Examples of computer program products include memory devices, optical storage devices, integrated circuits, servers, online software, etc. Preferably, the computer program product comprises non-transitory program code stored on a computer readable medium for performing an embodiment of a method when said program product is executed on a computer.

In an embodiment, the computer program comprises computer program code adapted to perform all the steps of an embodiment of the container builder method or cloud service provider method when the computer program is run on a computer. Preferably, the computer program is embodied on a computer readable medium.

A further aspect of the invention concerns a computer-readable medium comprising data representing a container image for providing an individualized network service. The container image comprises sensitive data and instructions for providing the individualized network service based on the sensitive data, allowing the service to be provided with limited data exposure.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of a network service system, FIG. 2 schematically shows an example of an embodiment of a network service system, FIG. 3 schematically shows an example of an embodiment of a network service system, FIG. 4a schematically shows an example of an embodiment of a cloud server, FIG. 4b schematically shows an example of an embodiment of an individualized network service, FIG. 4c schematically shows an example of an embodiment of a container builder, FIG. 5 schematically shows an example of an embodiment of a network service system.

Figure 1:
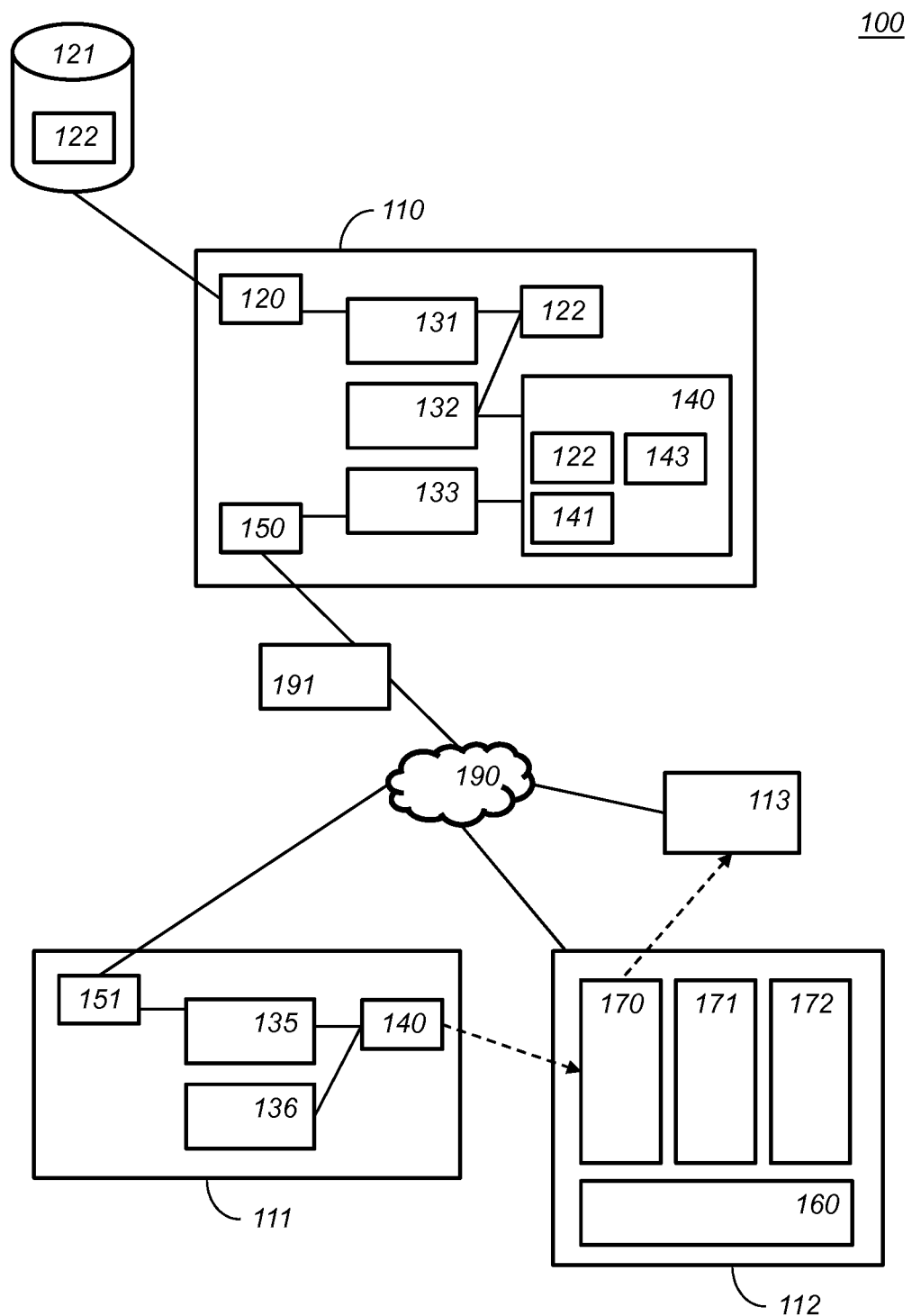

LIST OF REFERENCE NUMERALS 100 a network service system
110 a container builder
111 a cloud service provider
112 a container host
113 a user device
120 a data interface
121 a database
122 sensitive data
131 a data handling unit
132 an image handling unit
133 a cloud handling unit
135 a builder handling unit
136 a deployment unit
140 a container image
141 instructions for providing an individualized network service
143 termination instructions
150, 151 a communication interface
160 a container platform
170, 171, 172 a container
190 a computer network
191 a firewall
200 a network service system
210 a container builder
211 a cloud service provider
212 a container host
213 a user device
220 a data interface
221 a database
223 updated data
231 a data handling unit
232 an image handling unit
233 a cloud handling unit
235 a builder handling unit
236 a deployment unit
240 a container image
244 an encryption key
245 a decryption key
246 encryption instructions
250, 251 a communication interface
260 a container platform
270 a container
280 a storage
290 a computer network
300 a network service system
310 a container builder
311 a cloud service provider
312 a container host
313 a user device
332 an image handling unit
336 a deployment unit
340 a container image
347 a token
348 a private address 349 instructions to verify token possession
350, 351 a communication interface
370 a container
390 a computer network
400 a cloud server
401 an authentication database
402 a record database
403 an application database
410 an administration console
411 application software
420 a SSH interface
421 a HTTP interface
422 a web API
430 an individualized network service
431 an authentication database
432 a record database
433 an application database
441 credentials of a particular user
442 data specific to a particular user
443 data needed for the particular service
450 application software
451 components needed for the particular service
460 interface for the particular service
470 a container builder
471 an authentication database
472 a database
473 an application database
474 software components
480, 488, 489 a container image
481 sensitive data
482 a subset of software components
500 a network service system
510 a container builder
512 a container host
513 a user device
514 a cloud server
521 a database
522 sensitive data
534 application software
560 a container platform
570 a container
580 a network service
581, 582 a redirect
1100 a hardware diagram for implementing a device
1110 a system bus
1120 a processor
1130 a memory
1140 a user interface
1150 a communication interface
1160 a storage
1161 a base operating system
1162-1164 instructions for data handling units/image handling units/ . . .
1200 a container builder method
1210 providing access to the database
1220 providing digital communication
1230 retrieving the sensitive data
1240 building the container image
1250 providing the container image
1300 a cloud service provider method
1310 providing digital communication
1320 receiving a container image
1330 deploying the container image
1900 a computer readable medium
1910 a writable part
1920 a container image
1921 sensitive data
1922 instructions for providing an individualized network service
2000 a computer readable medium
2010 a writable part
2020 a computer program

DETAILED DESCRIPTION OF EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

Figure 2:
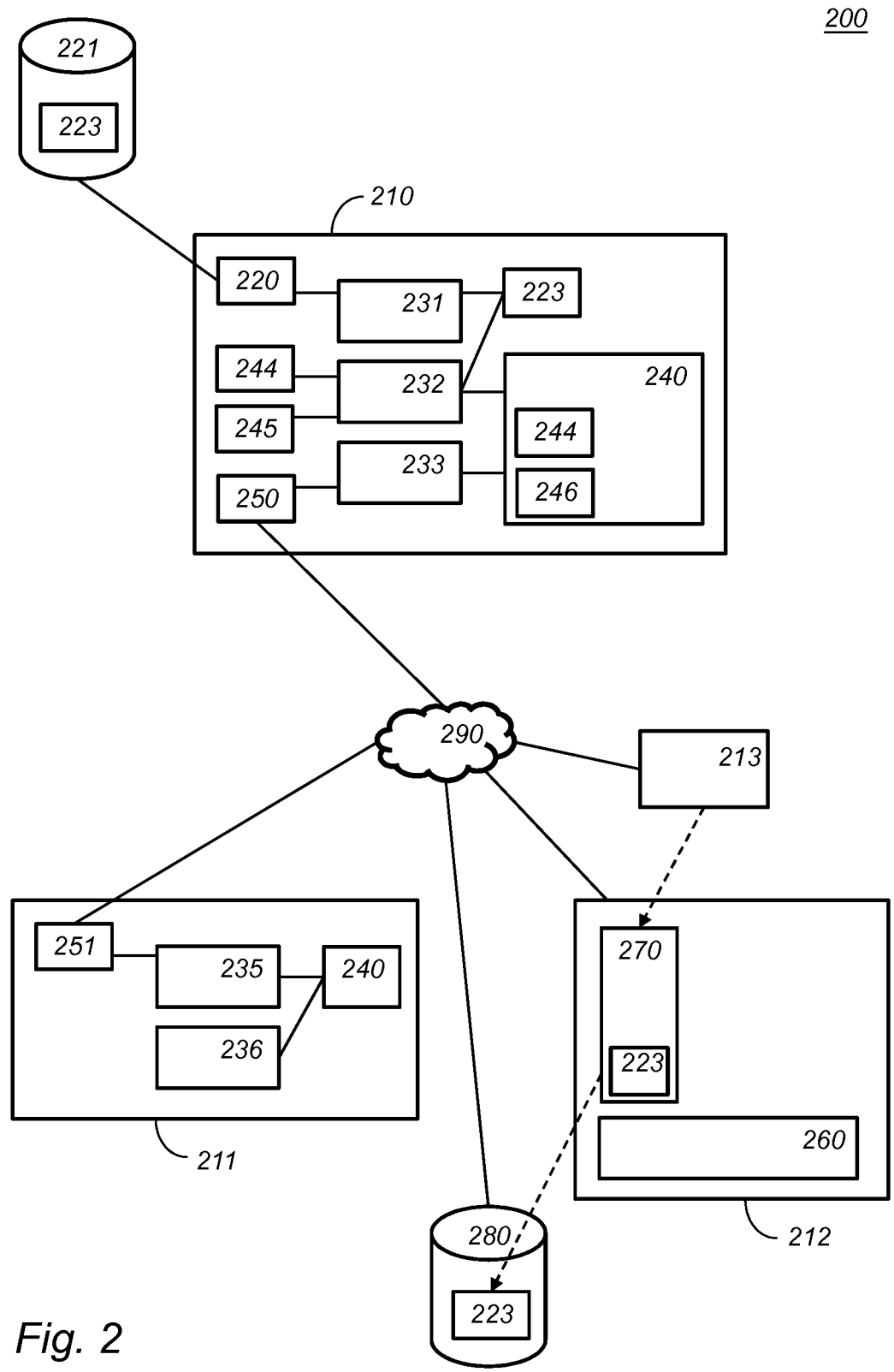
Figure 3:
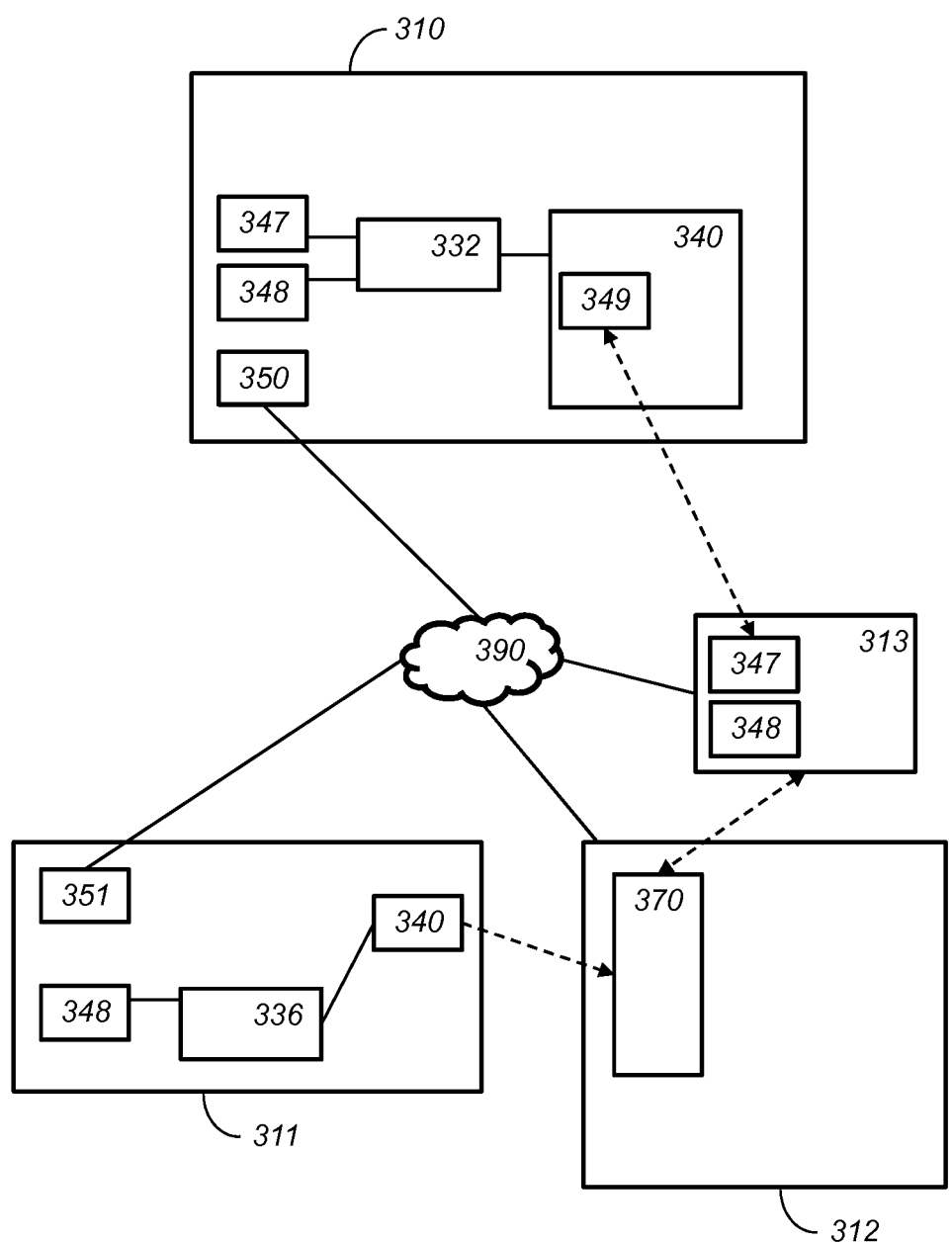
Figure 4A:
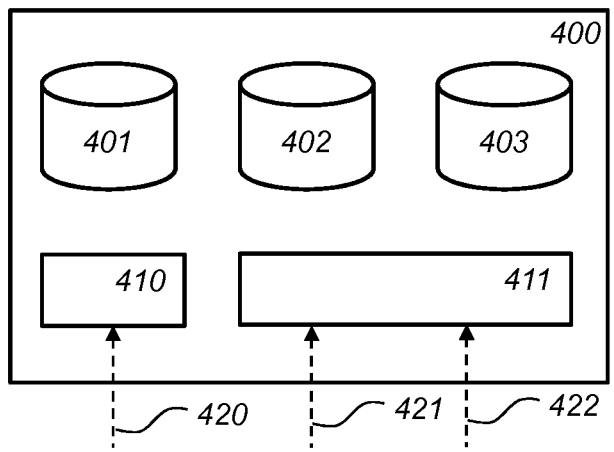
Figure 4B:
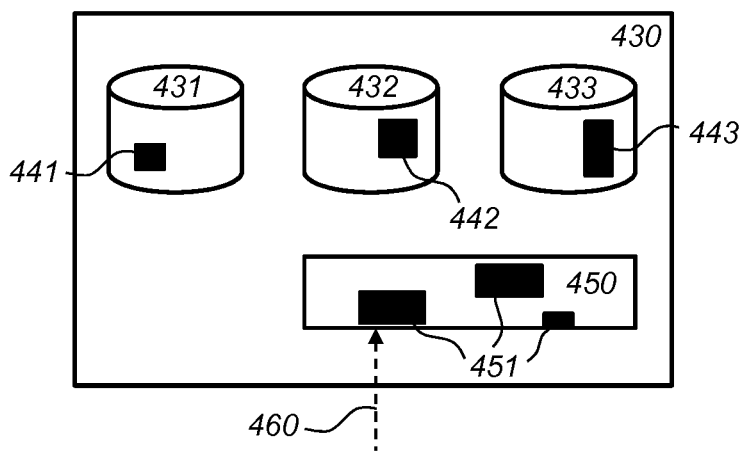
Figure 4C:
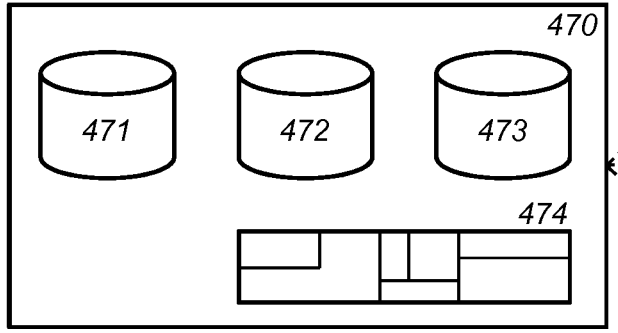
Figure 4C:
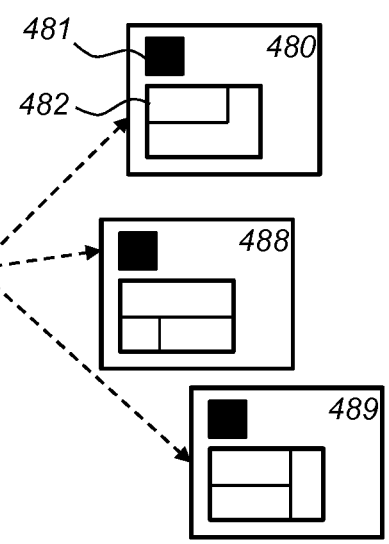

Before discussing the detailed embodiments of FIG. 1-FIG. 3, various aspects of the invention are first discussed with respect to FIG. 4a-FIG. 4c.

As a motivating example to explain various aspects of embodiments set out below, consider a web-based portal for patient assessment. For example, patients may use such a portal to provide information about their health status after receiving a certain kind of therapy. Such a system is typically based on medical data, e.g., questions asked to the patient may depend on the particular treatment received and/or the user may be able to inspect at least parts of their electronic medical record. Moreover, the system may also produce new data, e.g., information about health status provided by the patient, that needs to be stored and further processed, e.g., provided to healthcare professionals involved in the therapy. Both the medical information used by the portal and the information produced by the portal are typically sensitive personal information about the patient. Apart from this, also the software used, e.g., a clinical decision support algorithm deciding which questions to ask or which advice to give, may be a sensitive asset. Hence, security measures are needed to ensure that the data and/or software does not fall into the wrong hands.

FIG. 4a shows an implementation of a system based on sensitive data on a cloud server 400, such as the web-based portal for patient assessment discussed above, that does not make use of private databases or container images. A web application may run on such a cloud server 400, e.g., a remote cloud server, and provide network services to clients, e.g., using a request-response pattern. Cloud server 400 may comprise, e.g., application software 411 providing network service and one or more databases. For instance, the databases may include an authentication database 401, e.g., comprising cryptographic keys, passwords, tokens, etc.; a record database 402, e.g., comprising electronic medical records or other sensitive information; and/or an application database 403, e.g., containing application data. A user may access a web application offered by application software 411, e.g., offered via HTTP interface 421, using a web browser. Application software 411 may also provide one or more web services, e.g., REST services, via web API 422. Before accessing the application, a user may need to identify himself to application software 411, e.g., wherein application software 411 authenticates credentials given by the user based on information in authentication database 401. Application software 411 may retrieve and/or store sensitive information in record database 402, e.g., the user can retrieve and/or update records of record database 402 as part of the application.

In a system such as the one of FIG. 4a, data of multiple users may be stored on cloud server 400, e.g., in databases 401 and/or 402. Encryption and/or other security measures may be used to improve data safety, privacy, and/or to prevent data breaches, exploits, or other attempts to get access to user data. Could server 400 may have the security risk that, if a hacker is able to compromise cloud server 400, data of all users, potentially thousands or millions of users, may be stolen, used for other attacks, and/or made public.

To minimize the risk of data breaches, access to application software 411 may be highly controlled, potentially leading to a degraded user experience. Still, there may be various security-related problems in systems arranged similarly to cloud server 400. For instance, besides the invalidation of single user accounts, for example, due to stolen passwords, also a programming error in application software 411 or an exploit may allow an attacker to get access to a large number of accounts and/or large amounts of data from record database 402. The inventors recognized as a cause of this problem that user data, e.g., user data about multiple users comprised in record database 402, and application software 411 reside in the same place, or at least that application software 411 potentially has access to user data about multiple users. Moreover, cloud server 400 may also comprise, for instance, an administration console 410, e.g., accessible via an SSH interface 420, and the presence of such an additional access channel may amount to a further security issue. Various embodiments described below may reduce risk of data breaches and/or avoid the need for additional administration channels.

Various embodiments relate to providing an individualized network service based on sensitive data. The inventors realized that, in order to offer a particular service to a particular user, not all parts of system 400 may be needed, e.g., system 400 may be individualized to particular user and/or for a particular service. FIG. 4b shows an example of an embodiment of an individualized network service 430. Individualization may refer to providing a particular service to one or more particular users, e.g., particular persons, systems, or devices, based on sensitive data specific to the one or more particular users, e.g., a subset of data from a database. For example, the data may comprise data that is specific to the particular service and/or particular user or set of users. For example, the data may be data about the user or users, and/or data to which the user or users specifically has access. For example, the individualized network service may use the sensitive data as an input and/or provide updated data as an output.

As an example, the individualized network service may be a web application such as the web-based patient assessment portal that was discussed above, individualized in order to allow a particular patient or group of patients to fill in a dedicated questionnaire. As another example, the individualized web service may be a web service, e.g., a REST web service, individualized for a particular user. The individualized network service does not need to be based on HTTP, in fact, the individualized network service may be any kind of network service that is individualized based on sensitive data, e.g., offered using known protocols such as FTP, IMAP, POP, or non-IP-based protocols, e.g., NetBIOS-based.

Providing an individualized web service to a user based on sensitive data specific to that user according to various embodiments may have as an advantage that data specific to other users may be effectively shielded from the individualized web service, decreasing the risk for a particular user that the data of that user is inadvertently accessed by another user or third party. In an embodiment, the sensitive data may comprise personal information about a user. The individualized network service may be offered to that user. In an embodiment, the personal information comprises an electronic medical record. Individualization is particularly relevant in such settings due to the particular sensitivity of data and/or particular legal requirements on processing personal information and medical data in particular.

As mentioned, an individualized network service 430 may not require all data and/or components of cloud server 400 to operate. For example, authentication database 431 may only need to contain authentication information 441 of a particular user, or of a plurality of particular users. Record database 432 may only need to contain data 442 specific to the user or plurality of users. Similarly, application database 433 may only need to contain data 443 needed for the particular service, e.g., images, UI elements, or other kinds of data used for the particular service but not for other services that may be offered to the same or other users at another point in time. Application software may also only need to contain components 451, e.g., software modules, libraries and the like, needed for the particular service. To the outside, only interface 460 for the particular service may need to be offered, e.g., no web API or SSH interfaces may be needed in this case. Compared to cloud service 400, individualized network service 430 may be regarded as a stripped-down version, although in practice the individualized network service may be constructed either by removing components of a full cloud server deployment, or by building up the individualized network service from scratch using only a selection of components, or using a combination of the two. An advantage of making such an individualized network service available as compared to cloud server 400 is that a potential data leakage will, at worst, reveal credentials and/or data specific to the user or users for which the network service was individualized. Moreover, less interfaces and/or less software decreases the risk of vulnerabilities being exploited and/or valuable software assets being compromised.

In various embodiments, individualization of network service is provided by means of containerization technology. When using containerization, applications are typically packaged into container images. For instance, a container image may comprise a self-contained package for running an application on a container host, e.g., comprising one or more components, e.g., application components and/or runtime components for running the application. For example, the container image may be for running the application on a container platform. In some embodiments, the runtime components do not comprise an operating system, decreasing image size and improving performance. In other embodiments, the runtime components may comprise an operating system, making the image more self-contained. Components in the container image may comprise, e.g., a web server, a database server, a data analytics toolkit, a simulator, etcetera. Generally, using container images may have as an advantage that they are lightweight yet self-contained, e.g., they contain one or more of application code, runtimes, system tools, libraries, and/or settings to run the application.

For example, this may eliminate the need to separately install and/or maintain libraries for applications running on the container host.

Various containerization technologies are available today based on various types of container images. For example, Docker technology allows Docker container images to be built based on a configuration file called a "Dockerfile" and then deployed as containers, e.g., on systems running the Docker Engine or on various cloud providers available on the market such as Heroku, Amazon Elastic Container Service, etcetera. Other types of container images can be JAR files; WAR files; Heroku slug files; disk images, e.g., for running on a hypervisor; archives such as ZIP or TAR files, e.g., for running in a chroot environment, etcetera. Depending on the containerization technology used and software available on the target platform, various software libraries may either be included in the container image or be used as provided by the platform, e.g., a container image for a Ruby on Rails application may include the application itself, but also the Ruby on Rails platform, the web server, system libraries, and/or the operating system, e.g., depending on which of these components are available on the deployment platform. Various cloud service providers are available that implement containerization technology by accepting container images for deployment and deploying them as containers on their infrastructure, e.g., Heroku and Amazon Elastic Container Service are examples of cloud service providers that accept Docker container images among other types of container images.

In particular, various embodiments involve a container builder. A container builder, also known as a container factory or container builder device, may be a device for building container images, e.g., container images that may be deployed using one of the containerization techniques discussed above. An example of an embodiment of such a container builder is schematically shown in FIG. 4c. Container builder 470 in FIG. 4c builds container images that are for providing an individualized network service based on sensitive data in a database. Container builder 470 has access, e.g., through a data interface, to a private database 472 comprising sensitive data, e.g., a record database as above. Container builder 470 may also have access to various other source of data and/or software, e.g., an authentication database 471, an application database 473, and/or a set of software components 474 for offering the individualized network service. At a high level, container builder 470 builds container images and provides them for deployment to a cloud service provider, e.g., using a communication interface. The container images, e.g., container image 480, 488 or 489, may be based on one or more of databases 471, 472, and 473, and software components 474. For example, container image 480 may comprise sensitive data 481 based on which the individualized network service is provided, e.g., obtained from private database 472 and/or other databases, and instructions that, when deployed as a container, cause the container to provide the individualized network service based on the sensitive data. For instance, the instructions may comprise a subset 482 of software components for offering the individualized network service from set 474 of software components, and similarly for the other container images. The personal information may for instance be stored in a database within the container image. Various embodiments of container builders are described below.

Interestingly, container builder 470 may have access to relatively large amounts of information, e.g., database 472 comprising information concerning multiple users, but it may only have a limited network exposure, e.g., it does not need to provide services to users directly. On the other hand, containers deployed from the container images built by container builder 470, e.g., container mages 480, 488 and 489, may need to be more exposed than container builder 470 since they need to offer the individualized network service to the user. However, they store and/or have access to only a subset, typically only a small portion, of the information that container builder 470 has access to. This arrangement provides an overall improvement in data protection since the exposure of sensitive data is decreased.

FIG. 1 schematically shows an example of an embodiment of a network service system 100 for offering an individualized network service. Network service system 100 may comprise a container builder 110, e.g., a container builder device. Network service system 100 may comprise a cloud service provider 111, e.g., a cloud service provider device, for deploying container images as containers. The containers may be deployed at cloud service provider 111 itself and/or at separate container hosts managed by the cloud service provider, e.g., container host devices. Shown in the figure is one such container host 112, but in an embodiment, network service system 100 comprises multiple container hosts managed by cloud service provider 111, and in another embodiment network service system 100 does not comprise container hosts other than cloud service provider 111 itself.

As discussed further below, FIG. 1 shows functional units, e.g., units 131, 132, 133, 135, and/or 136, that may be functional units of processors of the respective devices, e.g., of a processor of container builder 110 or cloud service provider 111. For example, container builder 110 of FIG. 1 may be used as a blueprint of a possible functional organization of the processor. The processor is not shown separate from the units in the figures. For example, the functional units of container builder 110 may be wholly or partially be implemented in computer instructions that are stored at container builder 110, e.g., in an electronic memory of container builder 110, and are executable by a microprocessor of container builder 110. In hybrid embodiments, functional units are implemented partially in hardware, e.g., as coprocessors, e.g., crypto coprocessors, and partially in software stored and executed on container builder 110, and similarly for the other devices in the various figures.

The various devices of network service system 100 may cooperate to provide an individualized network service to a user device 113 based on sensitive data 122 in a database 121. In an embodiment, the sensitive data comprises personal information about a user; for example, network service system 100 may be for providing the individualized network service to this user, e.g., though user device 113. In an embodiment, the personal information comprises an electronic medical record. In an embodiment, the sensitive data does not comprise authentication or authorization information, e.g., the sensitive data does not comprise database credentials. User device 113 may be any device with network connectivity, e.g., a laptop, a desktop computer or a mobile device such as a mobile phone or a tablet, e.g., when the individualized service is a web application; or a server, e.g., when the individualized service is a web service.

In an embodiment, the individualized network service is provided to multiple users, e.g., a strict subset of potential users of the service, e.g., corresponding to a strict subset of entries of database 121. For example, the number of users may be configurable. This may allow for a dynamic security/efficiency trade-off between the extremes of a network service individualized to a single user, with higher security and lower efficiency, and a network service offered to all users at the same time, with lower security and higher efficiency.

The various devices of system 100 communicate with each other over a computer network 190. The computer network may be an internet, an intranet, a LAN, a WLAN, etc. Computer network 190 may be the Internet. The computer network may be wholly or partly wired, and/or wholly or partly wireless. For example, the computer network may comprise Ethernet connections. For example, the computer network may comprise wireless connections, such as Wi-Fi, ZigBee, and the like. The devices comprise a connection interface which is arranged to communicate with other devices of system 180 as needed. For example, the connection interface may comprise a connector, e.g., a wired connector, e.g., an Ethernet connector, or a wireless connector, e.g., an antenna, e.g., a Wi-Fi, 4G or 5G antenna. For example, container builder 110 and cloud service provider 111 may comprise communication interfaces 150 and 151, respectively. Computer network 190 may comprise additional elements, e.g., a router, a hub, etc.

Network service system 100 may make use of containerization technology to limit exposure of sensitive data. Container builder 110 may build a container image 140 and provide it to cloud service provider 111 for deployment. Cloud service provider 111 may deploy container image 140, for example, on a container host 112. Interestingly, container image 140 may comprise sensitive data 122 and instructions that, when deployed as a container, cause the container to provide the individualized network service based on sensitive data 122. This may enable cloud service provider 111 to provide the cloud service on a host that does not itself have access to database of sensitive information 121, thereby limiting exposure of database 121.

Various technologies to operate cloud service providers and/or container hosts per se are known from the literature. Typically, container host 112 is configured to run a container platform 160 and one or more containers, e.g., containers 170, 171, and 172, on top of this container platform. In an embodiment, container platform 160 runs on top of an operating system and containers 170, 171, 172 do not comprise an operating system themselves. For example, container platform 160 may comprise Docker Engine and containers 170, 171, and 172 may be Docker containers. In an embodiment, container platform 160 comprises a hypervisor, and one or more containers 170, 171, 172 may be virtual machines, e.g., deployed from a container image comprising a disk image. In this case containers 170, 171, 172 may comprise an operating system. In an embodiment, container platform 160 may comprise a Unix-like operating system, and one or more containers 170, 171, 172 may comprise software operating in a chroot jail. For example, a container image for such a chroot jail may comprise a set of files that the software in the chroot jail has access to. In an embodiment, 170, 171, 172 are dynos of Heroku platform 160.

As discussed above, cloud service provider 111 may deploy the container image on cloud service provider 111 itself rather than on a separate container host. In such a case, cloud service provider 111 acts as a container host itself, e.g., cloud service provider 111 itself may run a container platform and one or more containers on top of this container platform, for instance, as described above. In such embodiments, service provider 111 is configured to deploy container 140 as a container on top of this container platform.

Cloud service provider 111 may also be a management node managing one or more container hosts. For example, cloud service provider 111 may be configured as a master node of a Kubernetes cluster, container host 112 and/or other container hosts being configured as compute nodes of the Kubernetes cluster. Or, cloud service provider 111 may be configured as a swarm manager of a Docker swarm, container host 112 and/or other container hosts being configured as nodes of the Docker swarm. Cloud service provider 111 may also be, e.g., an OpenStack controller node, container host 112 and/or other container hosts being configured as compute nodes of the OpenStack cluster. Using multiple container hosts increases scalability but may also make it less predictable at which host a container image will be deployed as a container and/or which other containers run on the same container host, complicating attacks across containers running in the same infrastructure. In some embodiments, cloud service provider 111 may be a conventional cloud service provider 111 such as Heroku, Amazon Elastic Container Service, Amazon EC2, and the like.

In particular, cloud service provider 111 may comprise a communication interface 151 configured for digital communication with container builder 110 and/or container host 112 and/or other devices of network service system 100, e.g., using computer network 190. Cloud service provider 111 also may comprise a builder handling unit 135 configured to receive a container image 140 using communication interface 151, e.g., from container builder 110. Cloud service provider 111 may further comprise a deployment unit 136 configured to deploy the container image as a container. For example, cloud service provider may deploy container image 140 at a container host such as container host 112, or on a container platform operating on cloud service provider 111 itself. This may be transparent to container builder 110, e.g., container builder 110 may not know, before and/or after deployment, at which particular host its container images are deployed.

Deployment of container image 140 may be initiated by container builder 110. For example, container builder 110 may receive an instruction to build a container image for providing an individualized network service based on sensitive data. For instance, the instruction may comprise one or more of an identification of a network service, e.g., from a predefined set of multiple network services, and an identification of one or more intended users of the network service, where the users may for example be persons or other network entities, e.g., users related to which database 121 stores sensitive data. The instruction may for example be received from an external network entity, e.g., container builder 110 may periodically contact the external network entity to receive instructions; they may be received from a user of container builder 110, for instance, via a user interface of container builder 110; or they may be received from another component of container builder 110, for example, a component that periodically monitors the database and/or the status of any deployed container images to determine that one or more individualized network services should be offered.

In some embodiments, the timeline for offering individualized network services may be relatively predictable. For instance, in a web-based patient assessment portal, a patient may be asked to fill in a survey periodically, e.g., every week or month. Moreover, the individualized network service may not be made available to the same set of users all the time, e.g., a patient is asked to fill in a monthly survey in three days so that, on average, only around a tenth of all patients have a survey waiting for them. Hence, in some embodiments, individualized network services are offered concurrently only to a subset of a set of potential users, e.g., a subset of users about which database 121 stores sensitive data. In such cases, offering individualized network services may be especially beneficial since sensitive data of users to which no service of offered, is unexposed.

In order to access database 121 comprising the sensitive data 122 on which container image 140 is based, container builder 110 may comprise a data interface 120. Database 121 may store sensitive data relating to multiple users, e.g., multiple sensitive records, each record representing sensitive data concerning one or more users. For example, a record may comprise a piece of medical information about a particular person, e.g., a patient. Database 121 may be a locally stored database. Database 121 may also be an external database, wherein data interface 120 connects to the external database. For example, when sensitive information from the database is needed, data interface 120 may be asked for it, after which data interface 120 may retrieve it, e.g., from the external database. The latter may be transparent to the rest of device 110. Database 121 may be configured as a private database of the container builder, e.g., a local database. For example, database 121 may be accessible through, or only through, a local area network (LAN), or database 121 may be a local database running at container builder 110. In particular, database 121 may not be accessible through computer network 190, or at least, may not be accessible by one or more of container host 112, cloud service provider 111 and user device 113. This may advantageously decrease exposure of database 121.

Container builder 110 may further comprise a data handling unit 131 configured to retrieve sensitive data 122 from database 121 using data interface 120. For example, upon receiving a request to provide a particular individualized network service based on sensitive data relating to a particular user, data handling unit 131 may select a subset of data, e.g., records, relating to the user, and retrieve the subset of data from database 121.

Container builder 110 may also comprise an image handling unit 132 configured to build container image 140 for providing the individualized network service. As discussed above, various types of container images 140 and tools for building container images, e.g., container images for providing a particular network service, are known and may be applied here. For instance, container image 140 may be a Docker container image, image handling unit 132 being configured to build container image 140 based on a Dockerfile using Docker, e.g., using the "docker build" command or similar. Building container image 140 may comprise selecting software components, e.g., modules and/or libraries, needed for providing the particular individualized network service, e.g., as discussed with reference to FIG. 4c above. Only selecting needed software components may have as an advantage that the amount of possibilities by which a container based on it may be compromised and/or the value of software assets that may be extracted from the container is decreased, e.g., only a limited set of clinical decision support or MRI reconstruction components relevant to the case at hand may need to be included, leaving non-included components unexposed.

Image handing unit 132 may be configured to build container image 140 based on a configuration, e.g., a configuration file, and optionally also to generate this configuration. For example, in embodiments based on Docker, the configuration may comprise the Dockerfile. Image handling unit 132 may for instance generate the configuration by instantiating a template configuration, e.g., by selecting parts of such a template and/or by filling in fields. For instance, this may be based on the particular network service to be offered and/or the particular user or users to whom the network service is to be offered. Image handling unit 132 may also re-use the same configuration, e.g., building an individualized container image 140 may comprise arranging various files referred to in the configuration based on the particular network service to be offered and/or the particular user or users to whom the service is to be offered. Various other image building tools may be similarly used, e.g., OpenStack's diskimage-builder or the jailkit tool to build a chroot environment.

As mentioned, container image 140 comprises sensitive data 122. For instance, sensitive data may be included in container image 140 in the form of a local database, e.g., image handling unit 132 may add to container image 140 database software and instructions and/or data to set up the database software with sensitive data 122. For example, the database software may be serverless database software such as sqlite. The included database may be a subdatabase of database 121. For example, image handling unit 132 may set up the included database as a subset of tables, columns, and/or rows of database 121 that are needed to provide the individualized network service, e.g., including sensitive data 122. For instance, the data may comprise credentials 441, user data 442, and/or service data 443 as discussed with reference to FIG. 4b. The software in container image 140, e.g., instructions 141, may be set up such that it connects to the local database, e.g., instead of connecting to remote database 121. This may be transparent to the software in container image 140 accessing the database, e.g., other than adjusting the database connection parameters, no other adaptation of the software may be needed to make it use sensitive data 122 from container image 140 instead of from a remote database. However, this is not necessary, e.g., use of local sensitive data may also be achieved by adapting software of container 140 such that it makes use of, e.g., text files instead of a database or such that sensitive data 122 is hard-coded in the instructions. In an embodiment, container image 140 does not contain instructions that, when deployed as a container, cause the container to retrieve sensitive data from an external database. Generally, including sensitive data 122 in container image 140 may alleviate the need for cloud service provider 111 and/or container host 120 and/or user device 113 to access database 131, improving security.

In an embodiment, container image 140 comprises termination instructions 143. Termination instructions 143 may, when deployed as a container, cause the container to terminate after a time limit. This may have as an advantage that there is no need for notifications and/or periodic checks for termination. Another advantage may be that exposure of the service is not needlessly prolonged. Termination instructions 143 may instead or in addition cause the container to terminate after use of the individualized network service is completed. For example, the container terminates after a predefined number of successful accesses to the individualized network service, e.g., after a single access or after at least or at most three or ten accesses. For example, a container offering a web-based patient assessment portal may terminate after an assessment has been completed. Terminating after use may have as advantages that exposure of the service is not needlessly prolonged and/or that detection may be used as an indication, e.g., by container builder 110, that use of the individualized network service is completed. Termination instructions 143 may also comprise instructions to delete certain data from the container, e.g., software modules comprising sensitive software assets or sensitive data that does not need to be kept, which may further reduce exposure of sensitive information.

In an embodiment, image handling unit 132 is configured to build container image 140 by first preparing the container image, e.g., before receiving a request to build the container image, and, upon receiving the request, customizing the container image based on the sensitive data 122. For example, building container image 140 may comprise multiple build steps, preparing the container image comprising a first set of build steps and customizing the container image comprising a second set of build steps, the second set of build steps comprising a step of adding particular user credentials and/or sensitive data to the container image. Image handling unit 132 may also build the container image using placeholder data instead of the sensitive data 122 and then, after retrieving the sensitive data 122 from database 121, replace the placeholder data with the sensitive data 122. For example, the placeholder data may be comprised in one or more particular files of the container image. Image handling unit 132 may replace these particular files by individualized files based on sensitive data 122. For example, these particular files may be text files or database files for database software, as discussed above. In any case, the amount of work performed while customizing may be relatively small, improving overall scalability.

Container builder 110 may further comprise a communication interface 150 configured for digital communication with cloud service provider 111 and/or other devices of network service system 100, for example, through computer network 190 as explained in more detail above. In an embodiment, container builder 110 is connected to cloud service provider 111 behind a firewall 191. For example, firewall 191 may comprise a network firewall controlling traffic between container builder 110 and other devices. In an embodiment, container builder does not accept incoming network connections from container builder 111 and/or container host 112 and/or user device 113. For example, cloud service provider 111 may not be directly accessible at all for incoming connections from computer network 190. Firewall 191 may alternatively or in addition comprise a host-based firewall, e.g., a host-based firewall running on container builder 110, e.g., a firewall blocking some or all incoming connections from computer network 190. Using a firewall may lead to further reduction in the exposure of sensitive data, e.g., sensitive data from database 121. Container builder 110 may not need to be connected to computer network 190 continuously. In an embodiment, container builder 110 is configured to connect to computer network 190 before providing container image 140 for deployment and/or to disconnect from computer network 190 after providing container image 140, further reducing its exposure.

Container builder 110 may also comprise a cloud handling unit 133 configured to provide container image 140 for deployment to cloud service provider 111 using communication interface 150. For example, cloud handling unit 133 may upload container image 140 to cloud provider 111 and send an instruction to deploy the container image to cloud provider 111, e.g., via SSH, a RESTful API or the like, e.g., when using Docker, using the "docker stack deploy" shell command or corresponding calls of the Docker Engine API. Cloud handling unit 133 may also store container image 140 in a private registry and instruct cloud service provider 111 to pull the image from the private registry and deploy it.

In all, various steps described above may result in an individualized network service being offered to user device 113 in such a way that sensitive data is less exposed. Container builder 110 may retrieve sensitive data 122 from private database 121 and put it in container image 140; however, no other device, e.g., neither cloud service provider 111 nor container host 112 nor user device 113 may be able to access database 121 directly, e.g., because of firewall 191. Container builder 110 provides container image 140 to cloud service provider 111 and cloud service provider deploys it at container host 112 such that container host 112 can offer the individualized service to user device 113. Although these steps may result in some exposure of sensitive data 122 that is needed for the present individualized network service, other sensitive data in database 121, e.g., relating to other users, may not be exposed, e.g., a compromise occurring during the offering of an individualized network service may have less impact on other users. Moreover, various containerization technologies may allow relatively good scalability, e.g., because an arbitrary number of container hosts may be used and/or its number dynamically adjusted, and/or because container hosts may allow to run similar or partially overlapping containers relatively efficiently.

FIG. 2 schematically shows an example of an embodiment of a network service system 200 involving updated data to be stored in the database. Network service system 200 may be network service system 100 as described above. For example, network service system 200 may comprise a private database 221 storing sensitive data 223, e.g., a private database of a container builder 210, and various components that allow to provide an individualized network service based on sensitive data.

In addition to using sensitive data, providing an individualized network service may also involve obtaining updated data updated by the individualized network service. For instance, the updated data 223 may comprise an input of a user of the individualized network service and/or a result of data processing by the container. The updated data may comprise sensitive updated data, for example, updates to sensitive data 122. The updated data may comprise information about a user of the individualized network service, e.g., personal information, e.g., medical information. Continuing with the motivating example of the web-based patient assessment portal above, a patient may be presented with various questions relating to their health, where the updated data comprises the answers to these questions. Generally, updated data arising from use of the individualized network service may comprise updates to the existing sensitive data based on which the service is offered and/or new data that was not stored in the database prior to the offering of the service. Various embodiments are discussed here in which updated data 223 is obtained by container builder 210 and stored in database 221.

Network service system 200 may comprise a container host 212, e.g., container host 112 of FIG. 1. Container host 112 may comprise a container 270. Container 270 may run on top of a container platform 260. A container image, e.g., container image 240, may be deployed as container 270 to provide the individualized network service based on sensitive data 223. Network service system 200 may also comprise a user device 213 to which the service is offered, e.g., user device 113 of FIG. 1. Similarly to FIG. 1, the present figure shows functional units, e.g., units 231, 232, 233, 235, and/or 236, that may be functional units of processors of respective devices.

In particular, network service system 200 may comprise a container builder 210, e.g., container builder 110 of FIG. 1. Container builder 210 may be for providing an individualized network service based on sensitive data 223. Container builder 240 may comprise data interface 220 for accessing database 221. Container builder 240 may also comprise a communication interface 250 for connecting with a cloud service provider 211, e.g., via a computer network 290. Container builder 240 may further comprise a data handling unit configured to retrieve sensitive data 223 from database 221 using data interface 223; an image handling unit 232 configured to build container image 240 comprising the sensitive data; and/or a cloud handling unit 233 configured to provide container image 223 for deployment to cloud service provider 211 using communication interface 250. Container image 240 may comprise instructions that, when deployed as a container, cause the container to provide the individualized network service based on sensitive data 223 comprised in container image 240.

Network service system 200 may further comprise a cloud service provider 211 for use with a container builder, e.g., cloud service provider 111 of FIG. 1. Cloud service provider 211 may comprise a communication interface 251 for connecting with container builder 210 and/or container host 212. Cloud service provider 211 may further comprise a builder handling unit 235 configured to receive from container builder 210 using communication interface 251 a container image 240 for deployment. Cloud service provider 211 may also comprise a deployment unit 236 configured to deploy container image 240 as a container. In the example embodiment shown in FIG. 2, container image 240 is deployed as a container 270 on container host 212, but as discussed above, container host 212 may also coincide with cloud service provider 211.

As a consequence of providing the individualized network service, container 270 may comprise updated data 223, as discussed above. For example, one or more files deployed in container 270 may have been modified and/or deleted, and/or one or more new files may have been created in container 270. For example, the updated data may comprise updates to one or more files comprised in container image 240. Updated data may be stored in a memory and/or in a storage of container 270.

In various embodiments, container builder 210 obtains updated data 223 of container 270. For example, image handling unit 232 may be configured to include in container image 240 instructions for container 270 to collect updated data 223 and provide it to container builder 210 and/or cloud service provider 211. For example, container 270 may upload the collected updated data 223 to a remote storage 280, e.g., a remote database or remote filesystem; container 270 may e-mail the collected updated data to an e-mail address accessible by container builder 211, or the like. Remote storage 280 is shown here as a separate network entity but may also, e.g., be an externally accessible storage of cloud service provider 211. Container builder 210 may be configured to obtain updated data 223 accordingly, e.g., by retrieving it from remote storage 280. Updated data 223 may also be obtained from container 270, e.g., by container builder 210, cloud service provider 212, or container platform 260. For example, container 270 stores updated data 223 during processing in an externally accessible storage, e.g., a storage accessible by cloud service provider 212 or container platform 260, such as a Docker bind mount or volume, a network share, etcetera. Cloud service provider 212 or container platform 260 may in such a case be configured to collect updated data 223 and provide it to container builder 210, e.g., by uploading it to remote storage 280. For example, collecting the updated data may be performed by a post-processing script performed after termination of the container 270, which may have as an advantage that fewer customizations to software in the container are needed.

Updated data 223 may be provided to container builder 210 in various formats, e.g., in the form of one or more database files, text files, etcetera. In an embodiment, cloud handling unit 233 retrieves an updated container image from cloud service provider 211 and image handling unit 132 extracts updated data 244 from the updated container image. For instance, the updated container image may be of a similar format as container image 240. This may have as an advantage that less customization of the software in the container needed, e.g., providing the updated data 223 may be transparent to the software in the container.

In various embodiments, updated data 223 is encrypted upon collection with an encryption key 244 and cloud handling unit 233 is configured to decrypt the obtained updated data 223 using a decryption key 245 corresponding to the encryption key 244. For instance, image handling unit 232 may include in container image 240 encryption instructions 246 for encrypting collected updated data 223 upon collection using encryption key 244, or cloud handling unit 233 may provide encryption key 244 to cloud service provider 211 and/or container host 212 for encryption upon collection. Image handling unit 232 may be configured to generate encryption key 244 and decryption key 245 or otherwise obtain them. Using encryption may decrease exposure of updated data 223. In some embodiments, encryption key 244 and decryption key 245 are both the same symmetric key; in other embodiments, encryption key 244 and decryption key 245 form a public/private key pair. The latter has as an advantage that not even the party performing the encryption or a party compromising its key material can decrypt updated data 223 once it is encrypted.

Typically, cloud handling unit 233 obtains updated data 223 upon termination of container 270. For example, cloud handling unit 233 may be configured to periodically check whether the container has terminated. For example, cloud handling unit 232 may contact cloud service provider 211 to obtain a status update regarding container 270, builder handling unit 235 of cloud service provider 232 being configured to provide such status updates to container builder 210 upon request. Cloud handling unit 232 may also contact container 270 directly to obtain a status update, e.g., by attempting to access the individualized network service provided by container 270 or by contacting container 270 in another way. Presence of the updated data in storage 280 may also indicate termination to cloud handling unit 233. Periodic checks by cloud handling unit 232 may have as an advantage that container builder 210 does not need to accept incoming connections to detect termination, e.g., it does not need to receive notifications. However, other options apart from the periodic checks described here may be used, e.g., cloud service provider 211 may be configured to notify container builder 210 upon termination of container 270, e.g., using a RESTful API offered by container builder 210, by e-mail, or using any appropriate notification mechanism. However, no checking for termination may be necessary, e.g., container 270 may be configured to terminate after a time limit as discussed above, cloud handling unit 232 being configured to retrieve updated data 223 after the time limit. Also, it may not be needed to wait for termination at all, e.g., cloud handling unit 233 may obtain updated data 223 from a running container.

Data handling unit 231 of container builder 210 may be configured to store updated data 223 in database 221 using data interface 220. Storing updated data 223 may comprise checking a validity of updated data 223. Data handling unit 231 may only store updated data 223 in database 221 if it is found valid. For instance, checking the validity may comprise checking that the updated data only comprises data related to an intended user of the individualized network service; checking that updated data 223 only comprises data related to the individualized network service; and/or checking that updated data 223 has not been tampered with, e.g., by verifying a checksum and/or digital signature on the data. For example, data handling unit 231 may assign an identifier to each container image provided for deployment, e.g., a unique identifier, e.g., randomly generated. Such an identifier may be included in container image 240. Data handling unit 231 may further keep a list of entries, an entry comprising an identifier of a container image, a user or set of users for which it is individualized, and/or a specification of data fields that are allowed to be modified. Upon retrieval of updated data 223, data handling unit 231 may obtain the identifier included in the corresponding container image, e.g., as part of the updated data 223, and check that the updated data 223 relates to the user or set of users and/or specification of data fields of the corresponding entry. Checking updated data 223 may have as an advantage that even if the container providing the individualized network service is comprised, such a compromise may only affect data relating to the particular user and/or particular network service and/or may not affect the data validity.

Overall, the various embodiments described above and exemplified by the system shown in FIG. 2 may allow database 221 to be updated with updated data 223. Updated data 223 may be provided, e.g., inserted or entered by user device 213, to container 270, as shown by a dashed line. The updated data 223 may then be obtained by container builder 210, e.g., container 270 uploads it to a remote database, as shown by another dashed line, and container builder 210 downloads it from the remote database. Finally, container builder 210 may store the updated data 223 in database 221. Hence database 221 may be updated without exposing it to remote access.

FIG. 3 schematically shows an example of an embodiment of a network service system 300 involving user authentication. Network service system 300 may comprise one or more of a container builder 310, a cloud service provider 311, a container host 312, and a user device 313.

For example, container builder 310 may be a container builder as described above, e.g., container builder 110 of FIG. 1 or container builder 210 of FIG. 2. In particular, container builder 310 may comprise an image handling unit 332, e.g., image handling unit 132 or image handling 232. Although not shown, container builder 310 may also comprise a data interface, a data handling unit and/or a cloud handling unit, e.g., units 120, 131, 133, 220, 231, and/or 233.

Similarly, cloud service provider 311 may be a cloud service provider as described above, e.g., cloud service provider 111 or 211, e.g., comprising a deployment unit 336 such as deployment unit 136 or deployment unit 236. Although not shown in the figure, cloud service provider 311 may also comprise a builder handling unit, e.g., unit 135 or 235.

Container host 312 may be container host 112 or 212, e.g., comprising container 370 such as container 170 or 270. User device 313 may be user device 113 or user device 213. The devices may use a computer network 390 to communicate, e.g., computer network 190 or 290. Similarly to FIG. 1, the present figure shows functional units, e.g., units 332 and/or 236, that may be functional units of processors of respective devices.

Image handling unit 332 of container builder 310 may arrange container 370 such that it provides access to the individualized network service only to users possessing certain authentication information. Image handling unit 332 may further provide this authentication information to an intended user of the individualized network service, e.g., to user device 313 or its owner. This may have the advantage of further restricting data exposure since an attacker may needs to undertake the additional effort of obtaining the authentication information. Various kinds of authentication information, or various combinations thereof, may be used, e.g., multi-factor authentication, e.g., two-factor authentication.

In an embodiment, the authentication information comprises a private address 348 for connecting to the container, e.g., a URL, a domain name, or similar. Private address 348 may be unique for a given user or set of users. For example, private address 348 may be a hidden subdomain. When providing container image 340 for deployment, container builder 310 may request cloud service provider 311 to deploy container image 340 at a private address. Cloud service provider 311 may deploy container image 340 at container host 312, generate private address, e.g., "a0123.networkservice.com", and map the private address to the container, e.g., in a DNS entry. The private address may comprise a random port number, e.g., 4824, at which the network service, e.g., web application, may be deployed. Cloud service provider 311 may provide the private address to container builder 310, or container builder 310 chooses or suggests at least part of the private address. In any case, container builder may instruct user device 313 to connect to private address 348, e.g., using an email a link to the private address 348, e.g., "http://a0123.networkservice.com:4824/", e.g., an invitation to fill in a patient assessment. Private addresses are user-friendly while, by being hard to guess, make it harder to compromise the security of the system.

In an embodiment, the authentication information comprises a token 347, e.g., a secret token. Container image 340 may comprise instructions 349 that, when deployed as a container, cause the container to verify that a connecting user possesses token 347. For example, token 347 may be a random string, e.g., a random string with a minimum length or a minimum entropy, e.g., at least 5 or at least 10 characters or at least 10 or 20 bits of entropy, e.g., "XHnRRldykv". For instance, image handling unit 332 may generate token 347 randomly. The container may be configured, e.g., to provide a web application only if it is accessed using the token, e.g., the token is included in the private address 348, e.g., "http://a0123.networkservice.com:4824/?token=XHnRRldykv". Or, token 347 may be a parameter for an individualized web service/web API. The use of tokens may make it harder to compromise the system without placing a high burden on the user.

The examples of authentication information given above may be combined with each other and with other types of authentication information to further improve security. For instance, a user of a web application may be asked to log in with normal credentials, e.g., as explained with reference to FIG. 4a and FIG. 4b. Container image 340 may comprise credentials 441 of the intended user from an authentication database that would normally also be used for user authentication. Other types of authentication, e.g., using a hardware token, may be used instead or in addition. Interestingly, when normal authentication mechanisms are combined with authentication information provided by container builder 310, the use of a container may be transparent to the user, e.g., the user may use the individualized network service in the same manner as if using a non-individualized network service like in FIG. 4a.

Figure 5:
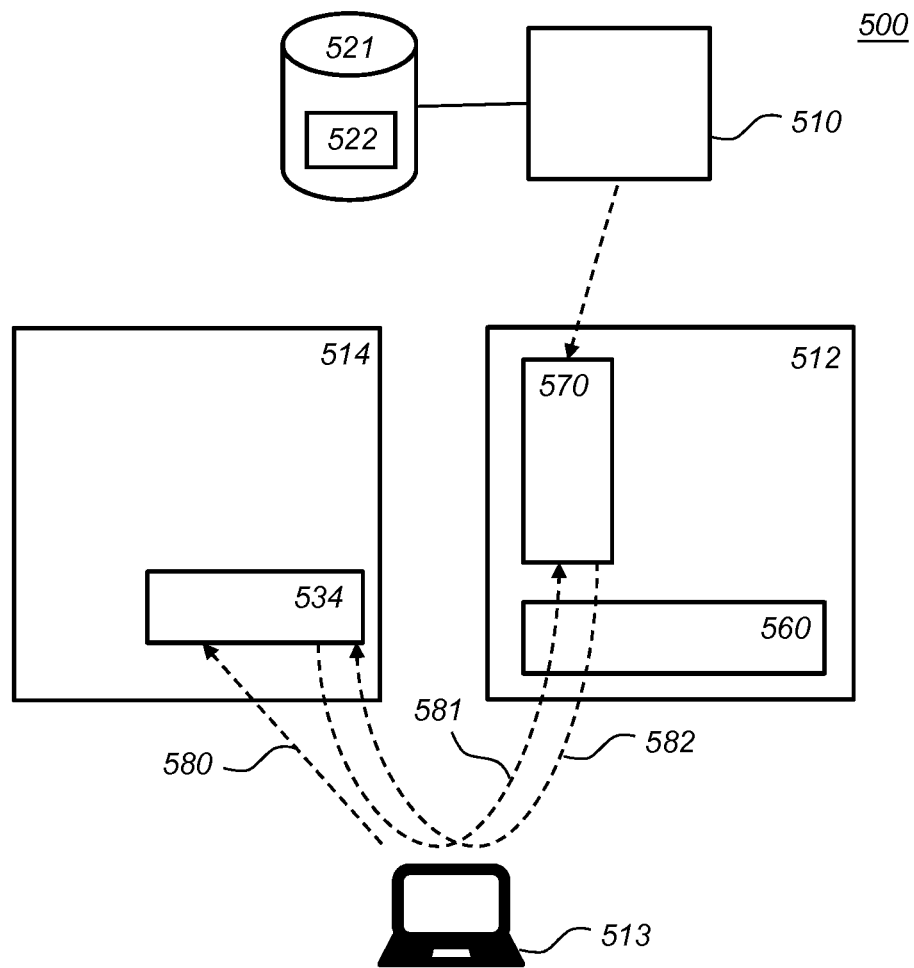

FIG. 5 shows an example of an embodiment of a network service system 500 in which an individualized network service provided by a container is combined with another network service, e.g., a non-individualized network service. Such embodiments may allow limiting exposure of sensitive data 522 without incurring unnecessary overhead, e.g., by applying containerization only if and when sensitive data 522 is actually used.

Shown in FIG. 5 is a cloud server 514, e.g., cloud server 400 of FIG. 4, e.g., offering a non-individualized network service through application software 534. Cloud server 514 can be any traditional server offering a network service 580, e.g., a web application, to a user device. Shown is also a user device 513 to which such a service is offered, shown here as a laptop for illustrative purposes only, e.g., user device 113, 213, or 313 as discussed above. As a motivating example, application software 534 may offer a web shop application to the user of user device 513, which the user may use to select various items for purchase. While browsing, the application may not need sensitive data 522 such as the user's address and/or credit card information.

At a certain point, the application being offered may require access to sensitive information 522. At this point, application software 534 may provide a redirect 581 redirecting user device 513 to container 570 running at container host 512. Redirect 481 may comprise incoming information of application software 534 for container 570. Container 570 is deployed from a container image built by a container builder 510 with access to database 521 comprising the sensitive information 522 as described above, e.g., container builder 510 may be container builder 110, container builder 210, or container builder 310, as described above. For example, cloud server 514 may instruct container builder 510 to deploy a container, and container builder 510 may be configured to provide the container image for deployment. Preparing the container image beforehand and customizing the container image based on sensitive data 522, as described above, may be particularly beneficial in this setting given the desire to minimize waiting time for the user. Having provided the container image for deployment, container builder 510 may then provide the address at which the individualized network service can be reached to cloud server 514. Cloud server 514 may then redirect 581 user device 513 to this address. Alternatively, access to container 570 may be detected, e.g., by container platform 560 of container host 512, at which point container builder 510 may provide the container image for deployment.

Being redirected to container 570, user device 513 may now make use of the individualized network service provided by the container. Continuing with the example above, the user device 513 may be redirected by redirect 581 to container 570 for checking out the shopping card. Sensitive information 522 comprised in the container image in this case may include, for example, credit card information and/or address information about the user. Incoming information comprised in redirect 581 may comprise, e.g., the contents of the shopping cart. Container image 570 may provide the individualized network service, e.g., process the payment of the user. Having provided the individualized network service, container 570 may provide a redirect 582 redirecting user device 513 to a cloud server, e.g., back to cloud server 514. Redirect 582 may comprise a return value of the individualized network service, e.g., in the payment example, indicating whether the payment was successful. User device 513 may continue using the web application, while container 570 based on sensitive information 522 may be cleaned up or terminated.

Hence, various embodiments shown schematically in FIG. 5 may allow to provide an application to a user device 513 that is partly based on information from database 521, and in which the exposure of information from the database 521 is limited, while at the same time allowing parts of the application that do not need access to the database to be provided using different techniques such as a more traditional cloud server 514.

Figure 6:
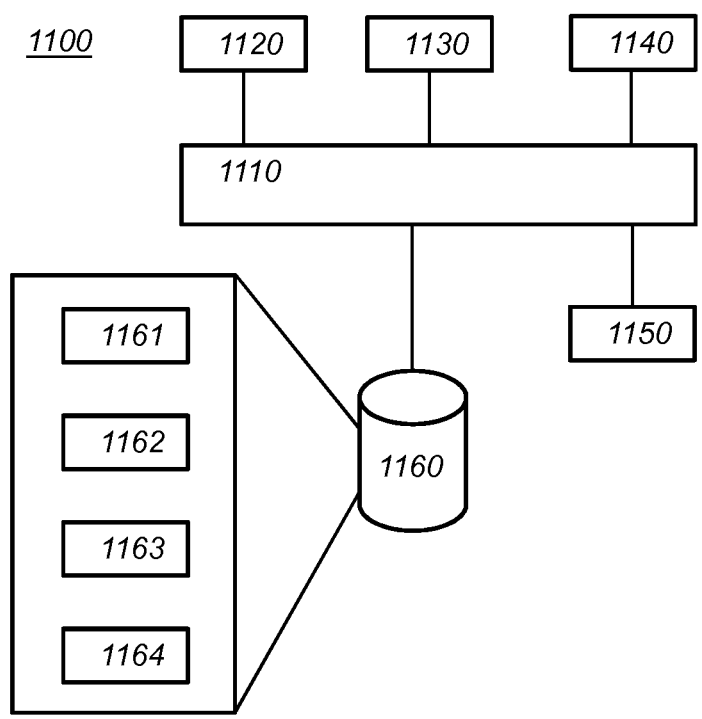
FIG. 6 shows a hardware diagram for implementing a device according to an embodiment, FIG. 7a schematically shows an example of an embodiment of a container builder method, FIG. 7b schematically shows an example of an embodiment of a cloud service provider method, FIG. 7c schematically shows a computer readable medium having a writable part comprising a container image according to an embodiment, FIG. 7d schematically shows a computer readable medium having a writable part comprising a computer program according to an embodiment.

FIG. 6 illustrates an exemplary hardware diagram 1100 for implementing a container builder, a cloud service provider, a container host, or a user device. The exemplary hardware 1100 may for instance correspond to any one of container builder 110, 210, 310, 470, or 510; cloud service provider 111, 211 or 311; container host 112, 212, 312, or 512; or user device 113, 213, 313, or 513. As shown, device 1100 includes a processor 1120, memory 1130, user interface 1140, communication interface 1150, and storage 1160 interconnected via one or more system buses 1110. It will be understood that FIG. 6a constitutes, in some respects, an abstraction and that the actual organization of the components of the device 1100 may be more complex than illustrated.

The processor 1120 may be any hardware device capable of executing instructions stored in memory 1130 or storage 1160 or otherwise processing data. As such, the processor may include a microprocessor, field programmable gate array (FPGA), application-specific integrated circuit (ASIC), or other similar devices. Processor 1120 may be provisioned, e.g., within a cloud computing architecture, etc. Further examples are shown herein. Processor 1120 may be implemented in a distributed fashion, e.g., as multiple sub-processors, e.g., sub-processor circuits.

The memory 1130 may include various memories such as, for example L1, L2, or L3 cache or system memory. As such, the memory 1130 may include static random access memory (SRAM), dynamic RAM (DRAM), flash memory, read only memory (ROM), or other similar memory devices. It will be apparent that, in embodiments where the processor includes one or more ASICs (or other processing devices) that implement one or more of the functions described herein in hardware, the software described as corresponding to such functionality in other embodiments may be omitted. Part or all of the memory may be an electronic memory, magnetic memory, etc.

The user interface 1140 may include one or more devices for enabling communication with a user such as an administrator. For example, the user interface 1140 may include a touch screen, a display, a mouse, and/or a keyboard for receiving user commands. In some embodiments, the user interface 1140 may include a command line interface or graphical user interface that may be presented to a remote terminal via the communication interface 1150.

The communication interface 1150 may include one or more devices for enabling communication with other hardware devices. The communication interface may be a network interface. For example, the communication interface 1150 may include a network interface card (NIC) configured to communicate according to the Ethernet protocol. The network interface may be to a local or wide area network, e.g., the Internet. Additionally, the communication interface 1150 may implement a TCP/IP stack for communication according to the TCP/IP protocols. The communication interface may also be a storage interface to an internal or external data storage, a keyboard, an application interface (API), etc. Various alternative or additional hardware or configurations for the communication interface 1150 will be apparent.

The storage 1160 may include one or more machine-readable storage media such as read-only memory (ROM), random-access memory (RAM), magnetic disk storage media, optical storage media, flash-memory devices, or similar storage media. Storage 1160 may comprise multiple discrete memories together making up said storage. Storage 1160 may also be a temporary memory, say a RAM. In the case of a temporary storage, said storage contains some means to obtain data before use, say be obtaining them over an optional network connection (not shown). In various embodiments, the storage 1160 may store instructions for execution by the processor 1120 or data upon with the processor 1120 may operate. For example, the instructions may have been downloaded and/or stored in a corresponding memory, e.g., a volatile memory such as RAM or a non-volatile memory such as Flash. For example, the storage 1160 may store a base operating system 1161 for controlling various basic operations of the hardware 1100. The storage may also store instructions 1162-1164 for performing the functions of various units described above, e.g., data handling units, image handling units, cloud handling units, builder handling units, or deployment units according to various embodiments described herein. A storage may be distributed over multiple distributed sub-storages. For example, the storage may have volatile and a non-volatile part. Part of the storage may be read-only.

It will be apparent that various information described as stored in the storage 1160 may be additionally or alternatively stored in the memory 1130. In this respect, the memory 1130 may also be considered to constitute a "storage device" and the storage 1160 may be considered a "memory." Various other arrangements will be apparent. Further, the memory 1130 and storage 1160 may both be considered to be "non-transitory machine-readable media." As used herein, the term "non-transitory" will be understood to exclude transitory signals but to include all forms of storage, including both volatile and non-volatile memories.

While device 1100 is shown as including one of each described component, the various components may be duplicated in various embodiments. For example, the processor 1120 may include multiple microprocessors that are configured to independently execute the methods described herein or are configured to perform steps or subroutines of the methods described herein such that the multiple processors cooperate to achieve the functionality described herein. Further, where the device 1100 is implemented in a cloud computing system, the various hardware components may belong to separate physical systems. For example, the processor 1120 may include a first processor in a first server and a second processor in a second server. Device 1100 may also be equipped with microprocessors and memories. Alternatively, the devices may, in whole or in part, be implemented in programmable logic, e.g., as field-programmable gate array (FPGA). The devices may be implemented, in whole or in part, as a so-called application-specific integrated circuit (ASIC), e.g., an integrated circuit (IC) customized for their particular use.

In an embodiment, the container builder may comprise a data circuit, a processor circuit, and a communication circuit. In an embodiment, the cloud service provider may comprise a communication circuit and a processor circuit. The container builder may comprise one or more of a data handling circuit, an image handling circuit, and a cloud handling circuit. The cloud service provider may comprise one or more of a builder handling circuit and a deployment circuit. The circuits implement the corresponding units described herein. The circuits may be a processor circuit and storage circuit, the processor circuit executing instructions represented electronically in the storage circuits. The circuits may also be, FPGA, ASIC or the like.

The processor may be a processor circuit, which may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

FIG. 1, FIG. 2, FIG. 3, FIG. 5 show functional units that may be functional units of the processor 1120. For example, container builder 110 of FIG. 1 may be used as a blueprint of a possible functional organization of the processor. The processor is not shown separate from the units in the figures. For example, the functional units of container builder 110 may be wholly or partially be implemented in computer instructions that are stored at container builder 110, e.g., in an electronic memory of container builder 110, and are executable by a microprocessor of container builder 110. In hybrid embodiments, functional units are implemented partially in hardware, e.g., as coprocessors, e.g., crypto coprocessors, and partially in software stored and executed on container builder 110, and similarly for the other devices in the various figures.

Typically, the container builder, the cloud service provider, the container host, and the user device each comprise a microprocessor which executes appropriate software stored at the respective devices; for example, that software may have been downloaded and/or stored in a corresponding memory, e.g., a volatile memory such as RAM or a non-volatile memory such as Flash. The respective devices may also be equipped with microprocessors and memories. Alternatively, the devices may, in whole or in part, be implemented in programmable logic, e.g., as field-programmable gate array (FPGA). The respective devices may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL etc.

Figure 7A:
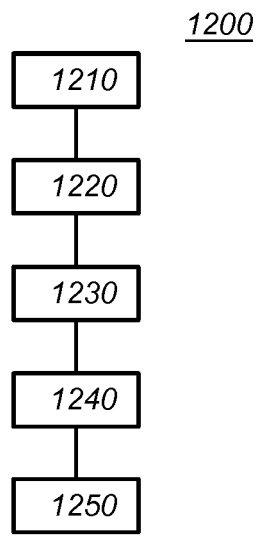

FIG. 7a schematically shows an example of an embodiment of a container builder method 1200 for building a container image. The container image is for providing an individualized network service based on sensitive data in a database. Container builder method 1200 comprises:

providing 1210 access to the database,
providing 1220 digital communication with a cloud service provider,
retrieving 1230 the sensitive data from the database,
building 1240 the container image, the container image comprising the sensitive data,
providing 1250 the container image for deployment to the cloud service provider, the container image comprising instructions that, when deployed as a container, cause the container to provide the individualized network service based on the sensitive data comprised in the container image.

Figure 7B:
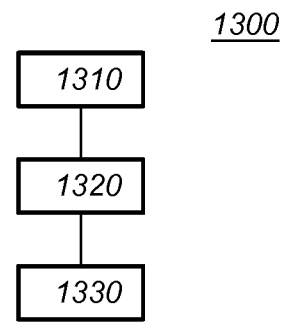

FIG. 7b schematically shows an example of an embodiment of a cloud service provider method 1300 for use with a container builder according to an embodiment. Cloud service provider method 1300 comprises:

providing 1310 digital communication with a container builder,
receiving 1320 from the container builder a container image for deployment, wherein the container image comprises sensitive data and instructions that, when deployed as a container, cause the container to provide an individualized network service based on the sensitive data, deploying 1330 the container image as a container.

Many different ways of executing the methods are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 1210 and 1220 may be executed, at least partially, in parallel. Moreover, a given step may not have finished completely before a next step is started.

Embodiments of the methods may be executed using software, which comprises instructions for causing a processor system to perform method 1200 or 1300. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of an embodiments of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 7C:
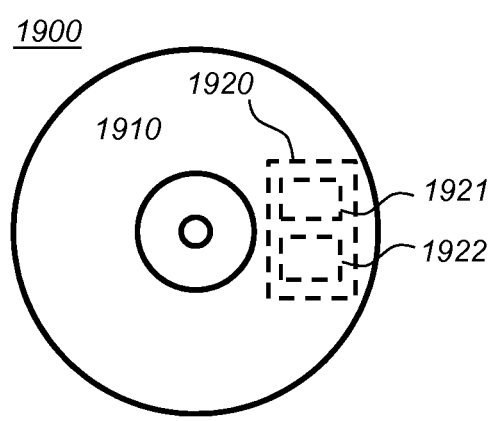

FIG. 7c shows a computer readable medium 1900 having a writable part 1910 comprising a container image 1920 for providing an individualized network service based on sensitive data. Container image 1920 comprises sensitive data 1921. Container image 1920 further comprises instructions 1922 that, when deployed as a container, cause the container to provide the individualized network service based on sensitive data 1921. The container image 1920 may be embodied on the computer readable medium 1900 as physical marks or by means of magnetization of the computer readable medium 1900. However, any other suitable embodiment is conceivable as well. Furthermore, it will be appreciated that, although the computer readable medium 1900 is shown here as an optical disc, the computer readable medium 1900 may be any suitable computer readable medium, such as a hard disk, solid state memory, flash memory, etc., and may be non-recordable or recordable.

Figure 7D:
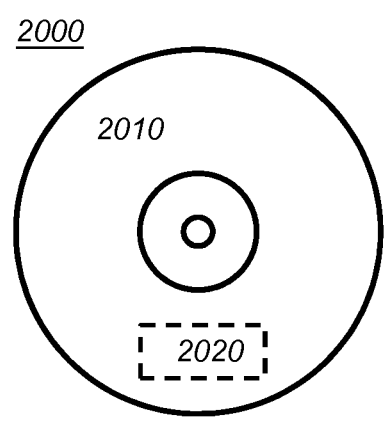

FIG. 7d shows a computer readable medium 2000 having a writable part 2010 comprising a computer program 2020, the computer program 2020 comprising instructions for causing a processor system to perform a container builder method or cloud service provider method according to an embodiment. The computer program 2020 may be embodied on the computer readable medium 2000 as physical marks or by means of magnetization of the computer readable medium 2000. However, any other suitable embodiment is conceivable as well. Furthermore, it will be appreciated that, although the computer readable medium 2000 is shown here as an optical disc, the computer readable medium 2000 may be any suitable computer readable medium, such as a hard disk, solid state memory, flash memory, etc., and may be non-recordable or recordable. The computer program 2020 comprises instructions for causing a processor system to perform said container builder method or cloud service provider method.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A container builder for building a container image, the container image being for providing an individualized network service based on sensitive data in a database, the container builder comprising:
   a data interface that accesses the database, the database being configured as a private database of the container builder,
   a communication interface that enables digital communication with a cloud service provider,
   a processor that:
      retrieves the sensitive data from the database using the data interface,
      builds the container image, the container image comprising the sensitive data,
      provides the container image for deployment to the cloud service provider using the communication interface, the container image comprising instructions that, when deployed as a container, cause the container to provide the individualized network service based on the sensitive data comprised in the container image; and
      provides authentication information to an intended user of the individualized network service, the container being arranged to provide access to the individualized network service only to users processing the authentication information.

2. A container builder as in claim 1, wherein the individualized network service is a web application.

3. A container builder as in claim 1, wherein the sensitive data comprises personal information about a user, the container image being arranged to provide the individualized network service to said user.

4. A container builder as in claim 1, wherein the container image comprises instructions that, when deployed as a container, cause the container to terminate after a time limit and/or after use of the individualized network service is completed.

5. A container builder as in claim 1, wherein the processor further:
obtains updated data, the updated data being updated by the individualized network service,
stores the updated data in the database using the data interface.

6. A container builder as in claim 5, wherein the container image further contains instructions that, when deployed as a container, cause the container to collect the updated data and provide it to the container builder or the cloud service provider.

7. A container builder as in claim 5, wherein the container image further comprises encryption instructions that, when deployed as a container, cause the container image to encrypt the updated data, obtaining the updated data comprising decrypting the encrypted updated data with a decryption key corresponding to the encryption key.

8. A container builder as in claim 5, wherein the container builder further checks a validity of the updated data and only stores the updated data in the database if it is valid.

9. A container builder as in claim 1, wherein the authentication information comprises a token and the container image comprises instructions that, when deployed as a container, cause the container to verify that a connecting user possesses the token.

10. A cloud service provider for use with a container builder according to claim 1, the cloud service provider comprising:
a communication interface configured for digital communication with the container builder,
a processor configured to:
receive from the container builder using the communication interface a container image for deployment, wherein the container image comprises sensitive data and instructions that, when deployed as a container, cause the container to provide an individualized network service based on the sensitive data,
deploy the container image as a container to provide the individualized network service based on the sensitive data.

11. A container builder method for building a container image, the container image being for providing an individualized network service based on sensitive data in a database, the container builder method comprising:
providing access to the database,
providing digital communication with a cloud service provider,
retrieving the sensitive data from the database,
building the container image, the container image comprising the sensitive data,
providing the container image for deployment to the cloud service provider, the container image comprising instructions that, when deployed as a container, cause the container to provide the individualized network service based on the sensitive data comprised in the container image; and
providing authentication information to an intended user of the individualized network service, the container being arranged to provide access to the individualized network service only to users processing the authentication information.

12. A cloud service provider method for use with a container builder according to claim 1, the cloud service provider method comprising:
providing digital communication with the container builder,
receiving from the container builder a container image for deployment, wherein the container image comprises sensitive data and instructions that, when deployed as a container, cause the container to provide an individualized network service based on the sensitive data,
deploying the container image as a container to provide the individualized network service based on the sensitive data.

13. A computer-readable medium comprising transitory or non-transitory data representing a container image for providing an individualized network service based on sensitive data, the container image comprising
sensitive data,
instructions that, when deployed as a container, cause the container to provide the individualized network service based on the sensitive data and authentication information to an intended user of the individualized network service, the container being arranged to provide access to the individualized network service only to users processing the authentication information.

14. A computer readable storage medium comprising transitory or non-transitory data representing instructions to cause a processor system to perform the method according to claim 1.

* * * * *